(12) United States Patent
Iorizzo et al.

(10) Patent No.: US 8,590,442 B2
(45) Date of Patent: Nov. 26, 2013

(54) GASKET FOR HIGH-PRESSURE PUMP AND HIGH-PRESSURE PUMP COMPRISING SAID GASKET

(75) Inventors: Rosanna Iorizzo, Molfetta (IT); Antonio Grimaldi, Bari (IT); Pietro Scotto Di Santolo, Naples (IT)

(73) Assignee: Robert Bosch GmbH, Stuttgart (DE)

( * ) Notice: Subject to any disclaimer, the term of this patent is extended or adjusted under 35 U.S.C. 154(b) by 842 days.

(21) Appl. No.: 12/746,701

(22) PCT Filed: Nov. 25, 2008

(86) PCT No.: PCT/EP2008/066118
§ 371 (c)(1),
(2), (4) Date: Jun. 7, 2010

(87) PCT Pub. No.: WO2009/071462
PCT Pub. Date: Jun. 11, 2009

(65) Prior Publication Data
US 2010/0266431 A1    Oct. 21, 2010

(30) Foreign Application Priority Data
Dec. 6, 2007   (IT) .............................. MI2007A2300

(51) Int. Cl.
*F16J 15/18* (2006.01)
*F02F 11/00* (2006.01)

(52) U.S. Cl.
USPC ....................................... 92/165 R; 277/591

(58) Field of Classification Search
USPC ......... 92/129, 165 R; 277/591, 593, 594, 595
See application file for complete search history.

(56) References Cited

U.S. PATENT DOCUMENTS

| 6,450,788 B1 | 9/2002 | Grabert |
| 2002/0027327 A1 | 3/2002 | Sugimoto et al. |
| 2006/0001222 A1 | 1/2006 | Dusslaer et al. |
| 2011/0001295 A1* | 1/2011 | Egloff et al. .................. 277/592 |

FOREIGN PATENT DOCUMENTS

| DE | 10310124 A1 | 9/2004 |
| EP | 1184572 A2 | 3/2002 |
| EP | 1184608 A1 | 3/2002 |
| EP | 1121530 B1 | 1/2003 |

* cited by examiner

*Primary Examiner* — Michael Leslie
(74) *Attorney, Agent, or Firm* — Michael Best & Friedrich LLP

(57) ABSTRACT

A high-pressure pump is provided with a high-pressure delivery line, a low-pressure supply line, a pumping element defined by a piston and cylinder, a cylinder head, and a gasket. The gasket is essentially flat and is provided with a sheet extending in a first plane and that has a first hole defining part of the low-pressure supply line, a second hole into which the cylinder head can be inserted, and a third hole defining part of the high-pressure delivery line. A coating of elastic material is provided to extend only around the first and second holes.

20 Claims, 3 Drawing Sheets

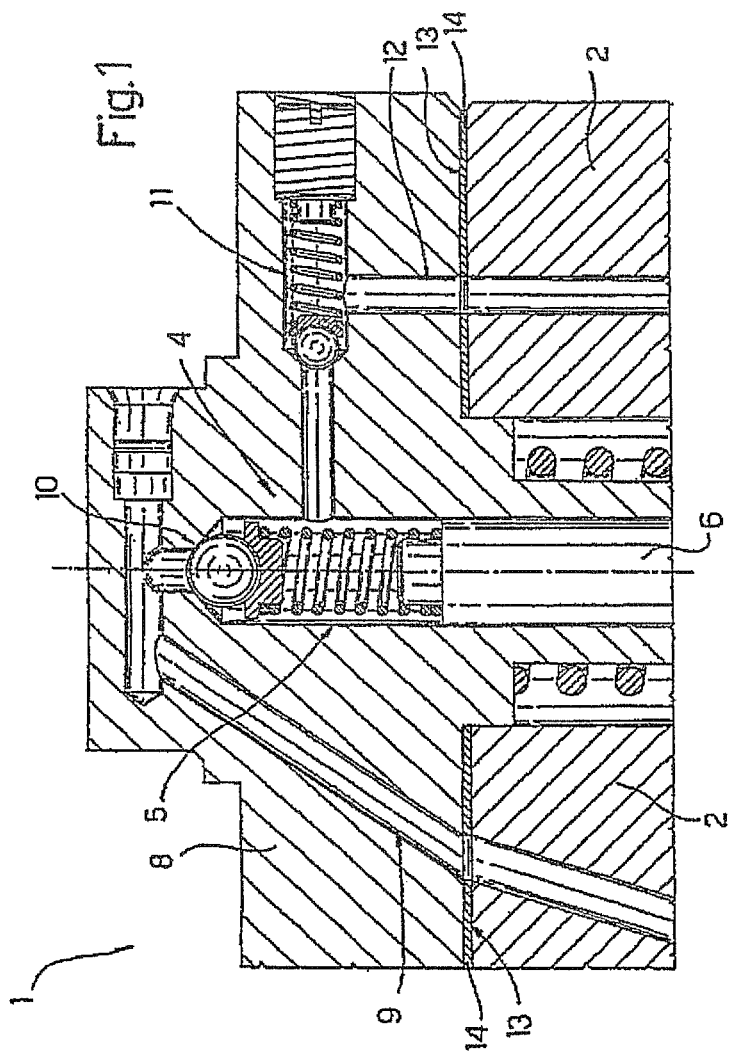

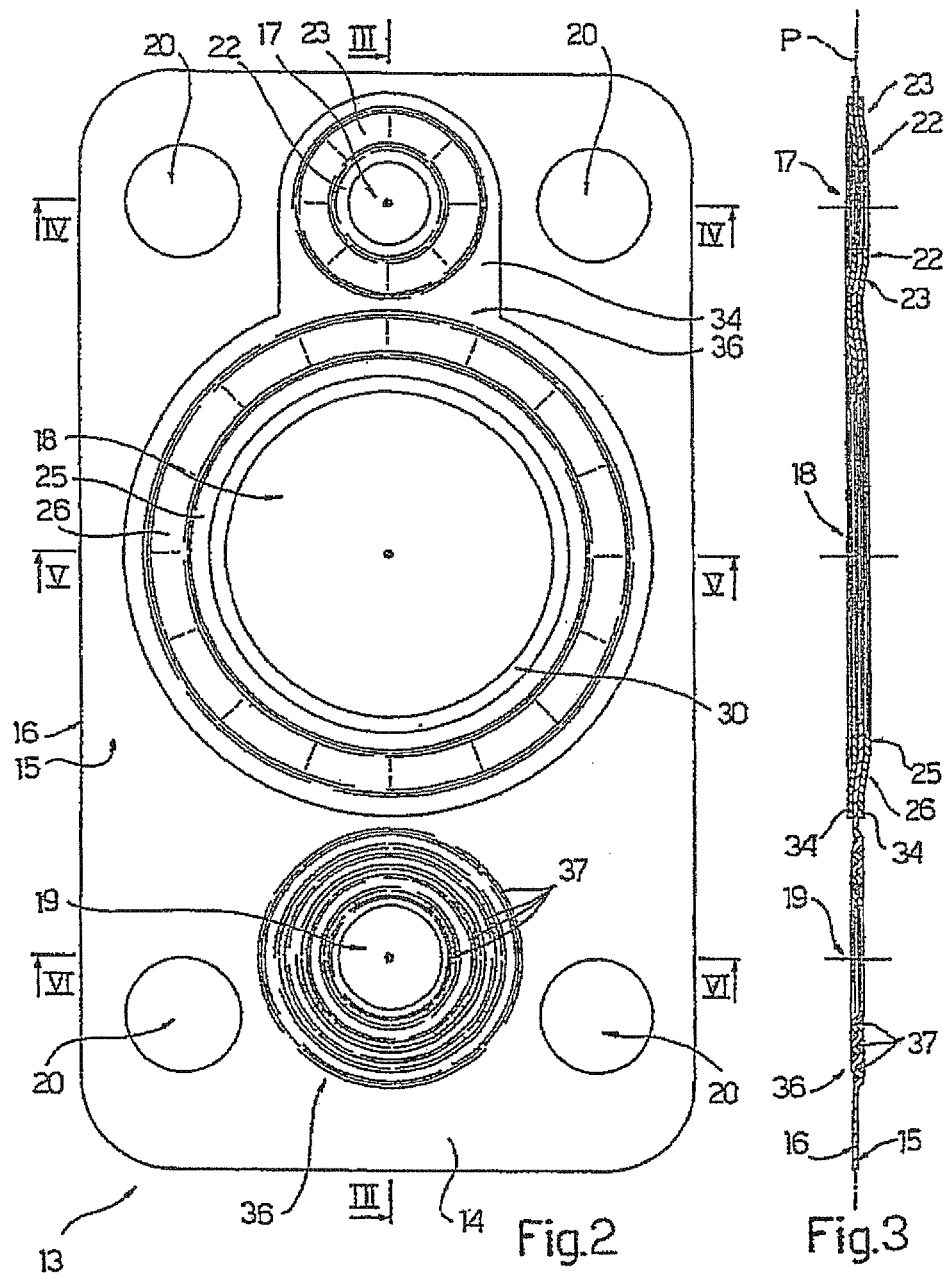

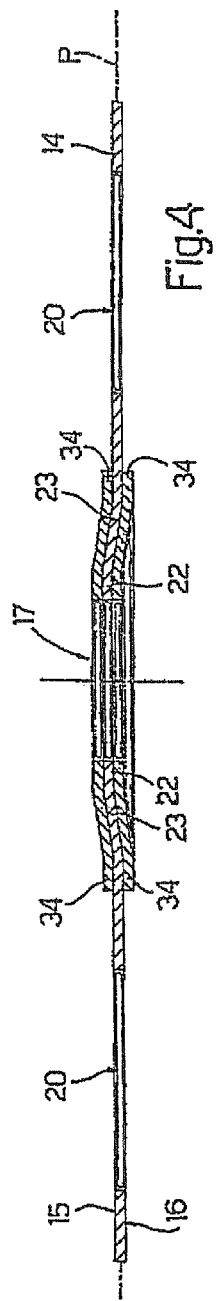
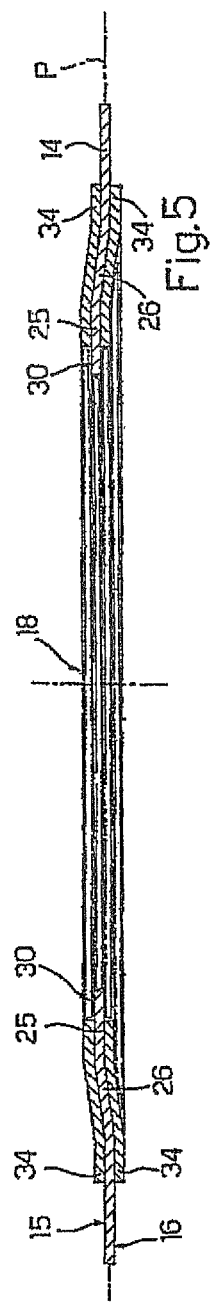
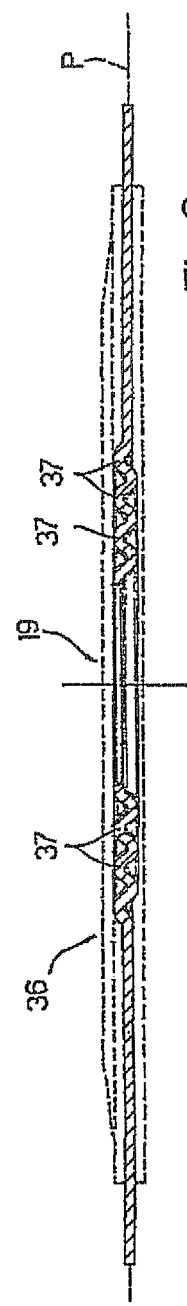

US 8,590,442 B2

GASKET FOR HIGH-PRESSURE PUMP AND HIGH-PRESSURE PUMP COMPRISING SAID GASKET

CROSS-REFERENCE TO RELATED APPLICATION

This application is a 35 USC 371 application of PCT/EP2008/066118 filed on Nov. 25, 2008.

BACKGROUND OF THE INVENTION

1. Field of the Invention

The present invention relates to a gasket and a high-pressure pump comprising said gasket. The invention particularly relates to a gasket and to a high-pressure fuel supply pump for an internal-combustion engine.

2. Description of the Prior Art

High-pressure pumps generally comprise a pump body, at least one pumping element defined by a cylinder and piston, and a cylinder head. The pumping element receives fuel from a low-pressure supply line, compresses it and sends it, along a high-pressure delivery line, to a high-pressure manifold or "common rail" as it is commonly known.

To prevent fuel leaks it is normal to use an essentially flat gasket placed between the pump body and the cylinder head: this gasket has a first hole defining part of the low-pressure supply line, a second hole into which the cylinder head can be inserted, and a third hole defining part of the high-pressure delivery line.

Document DE 103 10 124 discloses a flat gasket with a sealing edge that extends around the first and third holes, creating a sort of embankment against potential fuel leaks from the first, second and third holes.

However, this type of gasket has proved to have a number of disadvantages. In particular, even when subjected to leak tests before being sold, gaskets of this type are often returned by the buyer as they do not give early indications of fuel leaks, which develop over the long term.

OBJECTS AND SUMMARY OF THE INVENTION

It is an object of the present invention to provide a gasket that does not have the drawbacks of the prior art indicated above; in particular, it is an object of the invention to provide a reliable gasket that is also simple and economical to produce.

In accordance with this object the present invention relates to an essentially flat gasket comprising a metal sheet extending principally in a first plane and having a first hole defining part of a low-pressure supply line, a second hole into which a cylinder head can be inserted, and a third hole defining part of a high-pressure delivery line; the gasket being characterized in that it comprises a coating of elastic material that extends only around the first and second holes.

It is another object of the invention to provide a high-pressure pump that does not suffer from fuel leaks.

In accordance with these objects, the present invention relates to a high-pressure pump comprising a high-pressure delivery line, a low-pressure supply line, a pumping element defined by a piston and cylinder, and a cylinder head; the pump being characterized in that it comprises an essentially flat gasket of the type according to the invention.

BRIEF DESCRIPTION OF THE DRAWINGS

Other features and advantages of the present invention will become clear from the description given below of a non-restrictive example of an embodiment thereof, with reference to the figures of the appended drawings, in which:

FIG. 1 is a sectional view, with parts removed for clarity, of a high-pressure pump according to the present invention;

FIG. 2 is a plan view of a gasket according to the present invention;

FIG. 3 is a view of section III-III of the gasket as marked in FIG. 2;

FIG. 4 is a view of section IV-IV of the gasket as marked in FIG. 2;

FIG. 5 is a view of section V-V of the gasket as marked in FIG. 2; and

FIG. 6 is a view of section VI-VI of the gasket as marked in FIG. 2.

DESCRIPTION OF THE PREFERRED EMBODIMENT

In FIG. 1 the reference number 1 denotes a high-pressure pump (in the figure only a portion of this is shown), which comprises a pump body 2, a pumping element 4 defined by a cylinder 5 and a piston 6, and a cylinder head 8.

The pump 1 also includes a low-pressure supply line 9 which supplies fuel at low pressure to the pumping element 4, a supply valve 10 housed in the cylinder 5, a delivery valve 11, and a high-pressure delivery line 12 which supplies a common rail (not shown in the appended figures) with the high-pressure fuel discharged by the delivery valve 11 and compressed by the pumping element 4.

In order to prevent fuel leaks between the pump body 2 and the cylinder head 8 when the pump 1 is running, the pump 1 comprises a gasket 13.

Referring to FIGS. 2 and 3, the gasket 13 comprises a sheet 14 that extends principally in a plane P, is essentially rectangular in shape, and defines two opposite faces 15 and 16.

The sheet 14 is made of metal, preferably stainless steel, and has a first hole 17 to define part of the low-pressure supply line 9, a second hole 18 into which the cylinder head 8 can be inserted, and a third hole 19 to define part of the high-pressure delivery line 12.

The sheet 14 also includes four holes 20 positioned approximately at the vertices of the sheet 14 through which tightening screws (not shown) can be inserted for the positioning of the gasket 13.

Referring to FIGS. 2-4, the sheet 14 has an offset annular portion 22 situated around the first hole 17 in an offset plane parallel to the plane P, and a tapering annular portion 23 situated around the first hole 17 and around the offset annular portion 22 to connect the offset annular portion 22 to the rest of the sheet 14 lying in the plane P. Referring to FIGS. 2-5, the sheet 14 has an offset annular portion 25 situated around the second hole 18 in an offset plane parallel to the plane P, and a tapering annular portion 26 situated around the second hole 18 and around the offset annular portion 25 to connect the offset annular portion 25 to the rest of the sheet 14 lying in the plane P.

The offset annular portions 22 and 25 and the tapering annular portions 23 and 26 of the sheet 14 have stiffness values lower than the stiffness values of the rest of the sheet 14 lying in the plane P. This gives the sheet 14 a certain elasticity in order to optimize the sealing capacity of the gasket 13 around the holes 17 and 18.

Referring to FIGS. 2-5, the gasket 13 includes a coating 34 of elastic material that extends on both faces 15 and 16 of the gasket 13, only around the first hole 17 and second hole 18 and that does not extend around the third hole 19.

In particular, the coating 34 at least partly covers the offset annular portions 22 and 25 and the tapering annular portions 23 and 26. Preferably, as illustrated in the appended figures, the coating 34 covers the offset annular portion 22 and the tapering annular portion 23 extending beyond the confines of the tapering annular portion 23; covers part of the offset annular portion 25 and the tapering annular portion 26 extending beyond the confines of the tapering annular portion 26; and also covers the area between the tapering annular portion 23 and the tapering annular portion 26. As illustrated more clearly in FIGS. 2 and 5, the coating 34 does not cover an annular region 30 of the offset annular portion 25 close to the second hole 18.

The coating 34 is thus so positioned as to prevent microleaks due to surface defects in the materials from which the gasket 13, the head 8 and the pump body 2 are made.

The elastic material from which the coating 34 is made is preferably a fluorine rubber containing perfluoroalkyl and/or perfluoroalkoxy substituent groups. Referring to FIGS. 2, 3 and 6, the sheet 14 comprises an annular corrugated portion 36 around the third hole 19: this portion is provided with corrugations 37 concentric with the third hole 19.

This corrugated shaping gives the gasket 13 greater stiffness around the third hole 19 defining part of the high-pressure line 12 compared with the other regions of the gasket 13, but also a suitable degree of flexibility, thus ensuring a good seal.

This invention has the following advantages.

The gasket 13 of the present invention is more reliable than the known gaskets of the prior art, it having been observed that the gaskets 13 of the present invention which pass the traditional leak tests are more reliable than known gaskets. The leak test normally involves subjecting the gasket to high stresses caused by ducts carrying fluids at high pressure.

For example, high-pressure pumps fitted with gaskets of the type disclosed in document DE 103 10 124 are often returned by the buyer complaining of leaks even after a few hours of use. This is obviously a problem both financially and in image terms for the manufacturer.

Specifically, some gaskets of the type indicated above, despite passing the leak test, are returned by the buyer reporting leaks around the hole defining part of the high-pressure delivery line. This is due to the presence of the sealing edge which extends around the hole defining part of the high-pressure delivery line and which prevents the detection of leaks that occur during the leak test especially around the hole defining part of the high-pressure delivery line. In more detail, during the leak test the sealing edge retains leaks due to defects in the hole defining part of the high-pressure line and therefore these defects are not detected during the test. Defective gaskets are then installed as original equipment in high-pressure pumps, which is obviously a financial problem both for the supplier and buyer. Finally, it will of course be obvious that modifications and variations may be made to the gasket and high-pressure pump described herein without departing from the scope of the accompanying claims.

The invention claimed is:

1. An essentially flat gasket comprising a metal sheet extending in a first plane, the metal sheet having a first hole defining part of a low-pressure supply line, a second hole into which a cylinder head can be inserted, a third hole defining part of a high-pressure delivery line, and a coating of elastic material that extends only around the first and second holes.

2. The gasket according to claim 1, wherein the coating extends only around the first and second holes on both planar faces of the metal sheet.

3. The gasket according to claim 1, wherein the sheet has an annular corrugated portion around the third hole.

4. The gasket according to claim 2, wherein the sheet has an annular corrugated portion around the third hole.

5. The gasket according to claim 3, wherein the corrugated portion is provided with corrugations concentric with the third hole.

6. The gasket according to claim 4, wherein the corrugated portion is provided with corrugations concentric with the third hole.

7. The gasket according to claim 1, wherein the sheet includes a first offset annular portion situated around the first hole in a second offset plane parallel to the first plane.

8. The gasket according to claim 7, wherein the sheet includes a first tapering annular portion situated around the first hole such as to connect the first offset annular portion to the rest of the sheet lying in the first plane.

9. The gasket according to claim 7, wherein the sheet includes a second offset annular portion situated around the second hole in a third offset plane parallel to the first plane.

10. The gasket according to claim 8, wherein the sheet includes a second offset annular portion situated around the second hole in a third offset plane parallel to the first plane.

11. The gasket according to claim 9, wherein the sheet includes a second tapering annular portion situated around the second hole such as to connect the second offset annular portion to the rest of the sheet lying in the first plane.

12. The gasket according to claim 10, wherein the sheet includes a second tapering annular portion situated around the second hole such as to connect the second offset annular portion to the rest of the sheet lying in the first plane.

13. The gasket according to claim 8, wherein the coating at least partly covers the first offset annular portion and the first tapering annular portion.

14. The gasket according to claim 11, wherein the coating at least partly covers the second offset annular portion and the second tapering annular portion.

15. The gasket according to claim 12, wherein the coating at least partly covers the second offset annular portion and the second tapering annular portion.

16. The gasket according to claim 1, wherein the elastic material is a fluorine rubber.

17. The gasket according to claim 16, wherein the fluorine rubber contains perfluoroalkyl and/or perfluoroalkoxy substituent groups.

18. A high-pressure pump comprising:
a high-pressure delivery line;
a low-pressure supply line;
a pumping element defined by a piston and cylinder, and a cylinder head; and
an essentially flat gasket as recited in claim 1.

19. A high-pressure pump comprising:
a high-pressure delivery line;
a low-pressure supply line;
a pumping element defined by a piston and cylinder, and a cylinder head; and
an essentially flat gasket as recited in claim 2.

20. A high-pressure pump comprising:
a high-pressure delivery line;
a low-pressure supply line;
a pumping element defined by a piston and cylinder, and a cylinder head; and
an essentially flat gasket as recited in claim 3.

* * * * *